Feb. 11, 1969   H. C. PLUMMER   3,426,777
SPEED GOVERNOR WITH RATE LIMITER
Filed July 17, 1967   Sheet 1 of 5
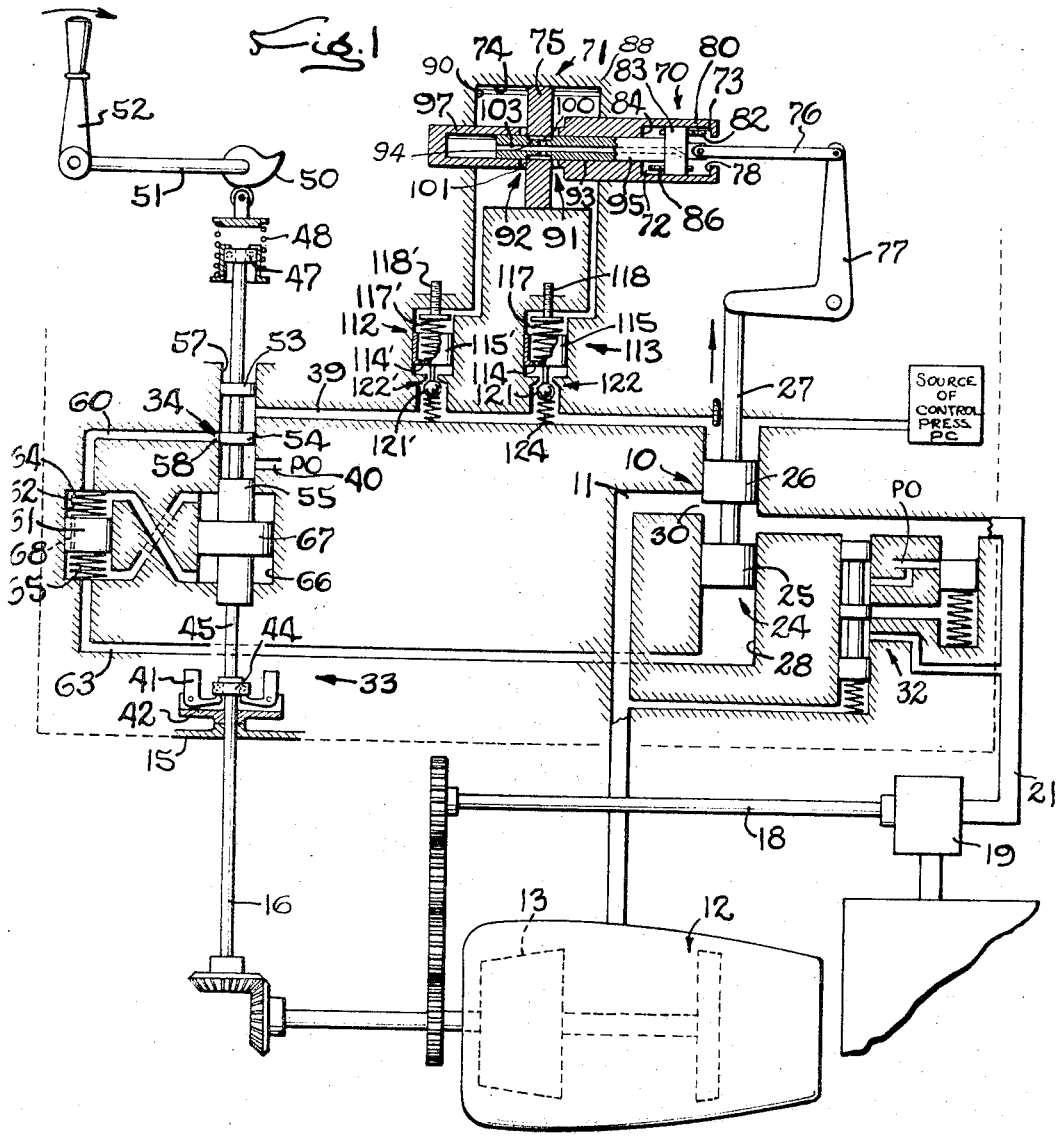
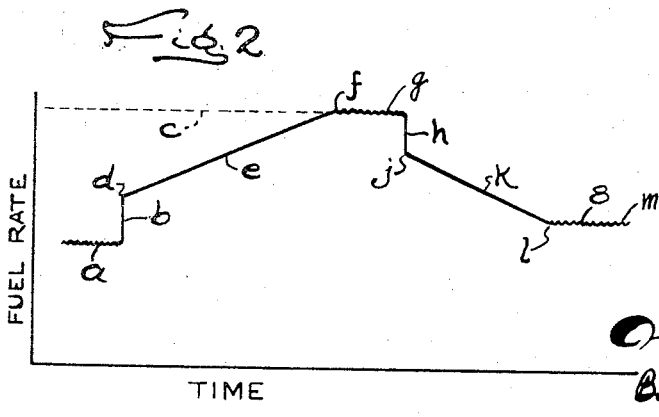
INVENTOR
Harland C. Plummer
By Wolfe, Hubbard, Voit & Osann
ATTORNEY

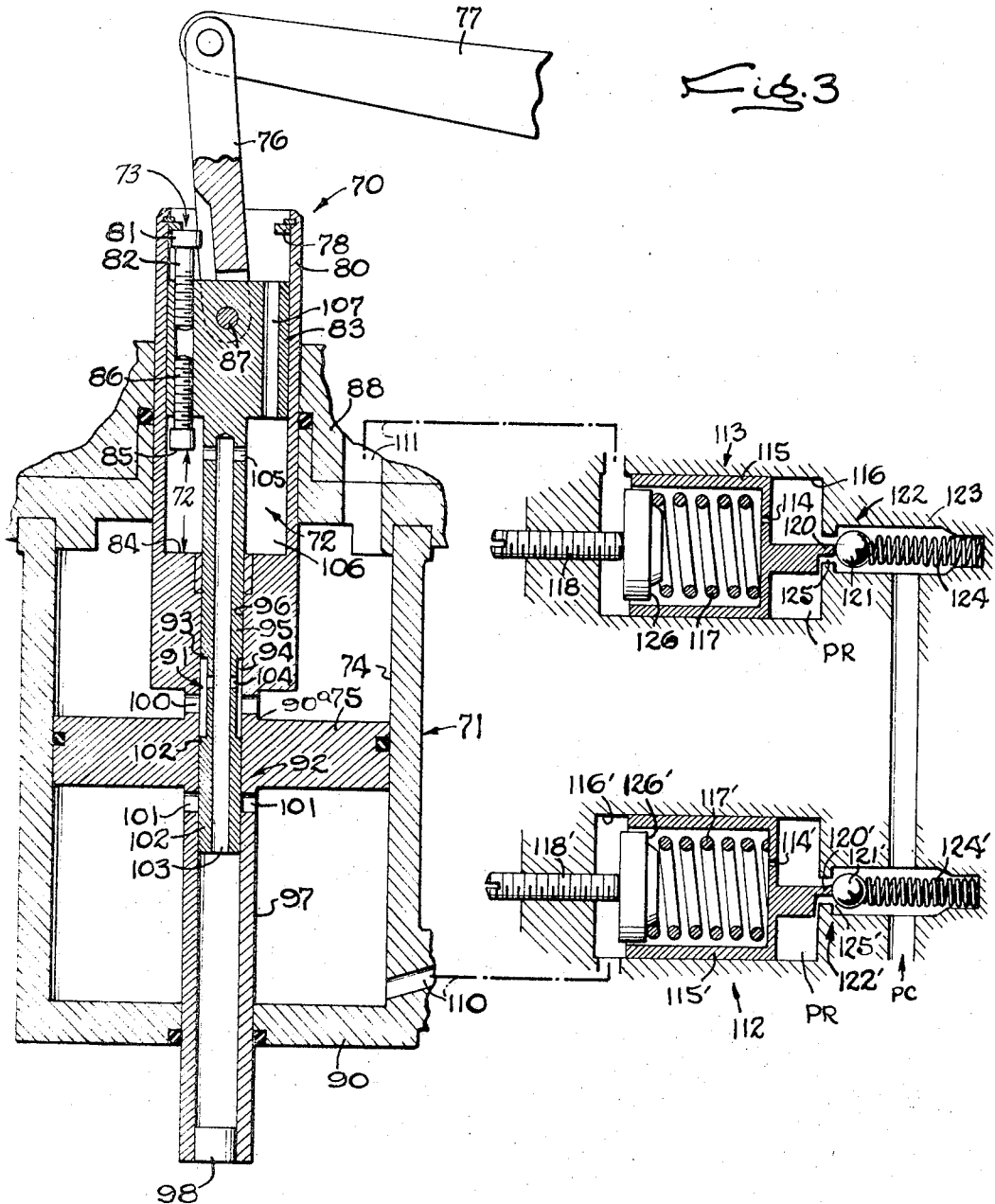

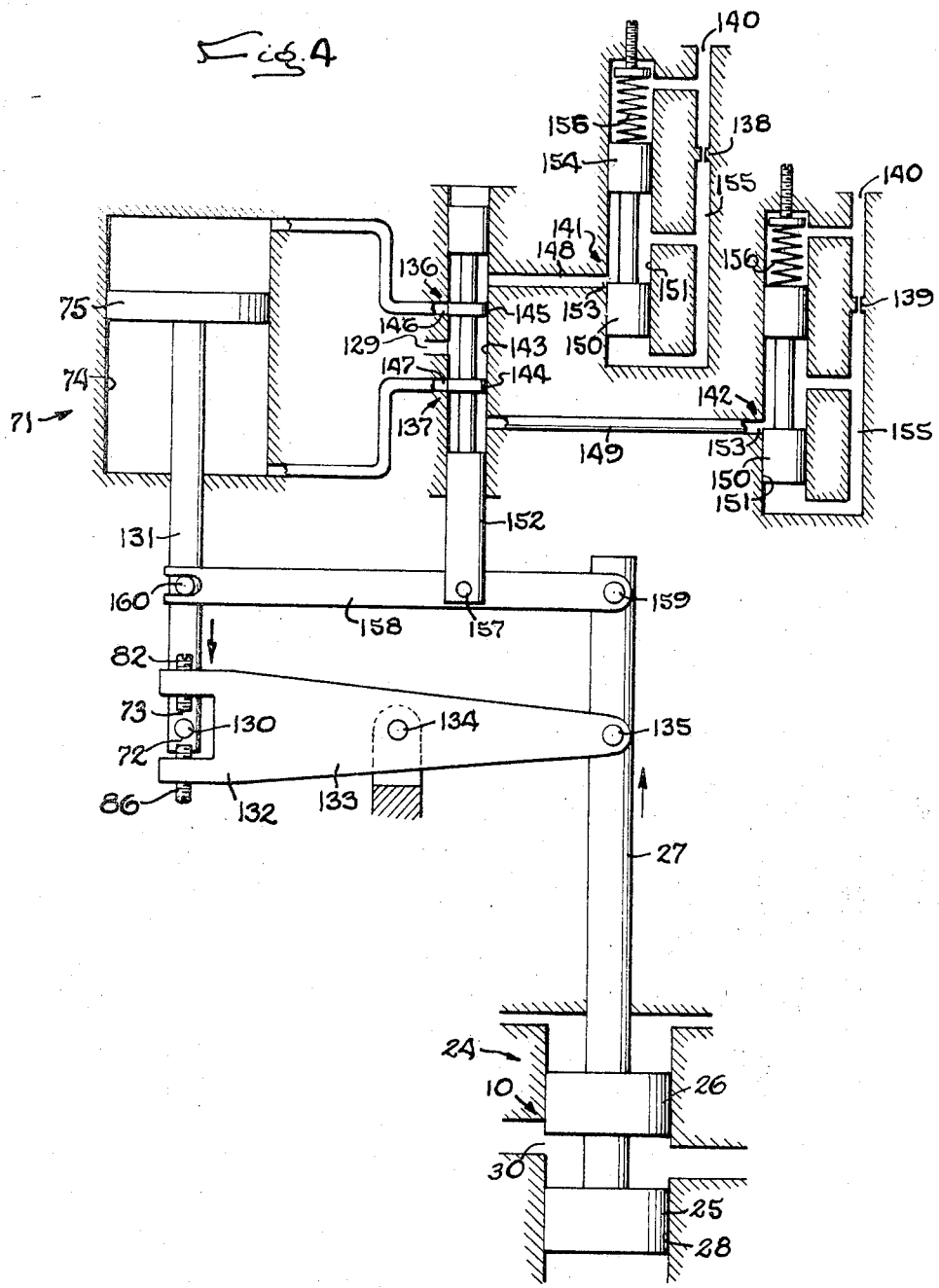

INVENTOR
Harland C. Plummer
By Wolfe, Hubbard, Voit & Osann
ATTORNEY

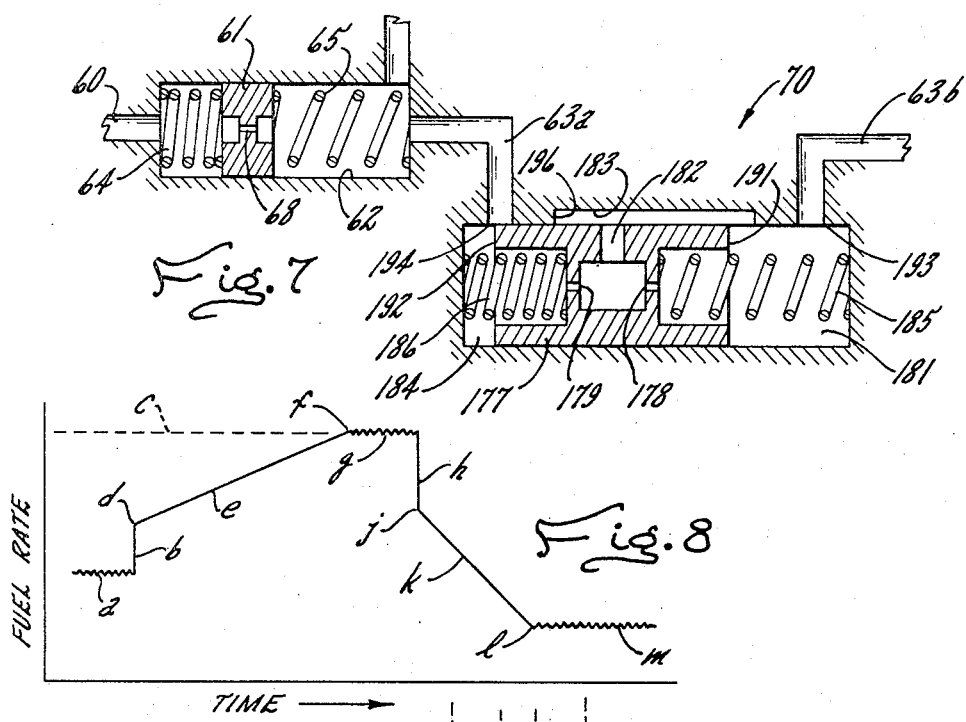
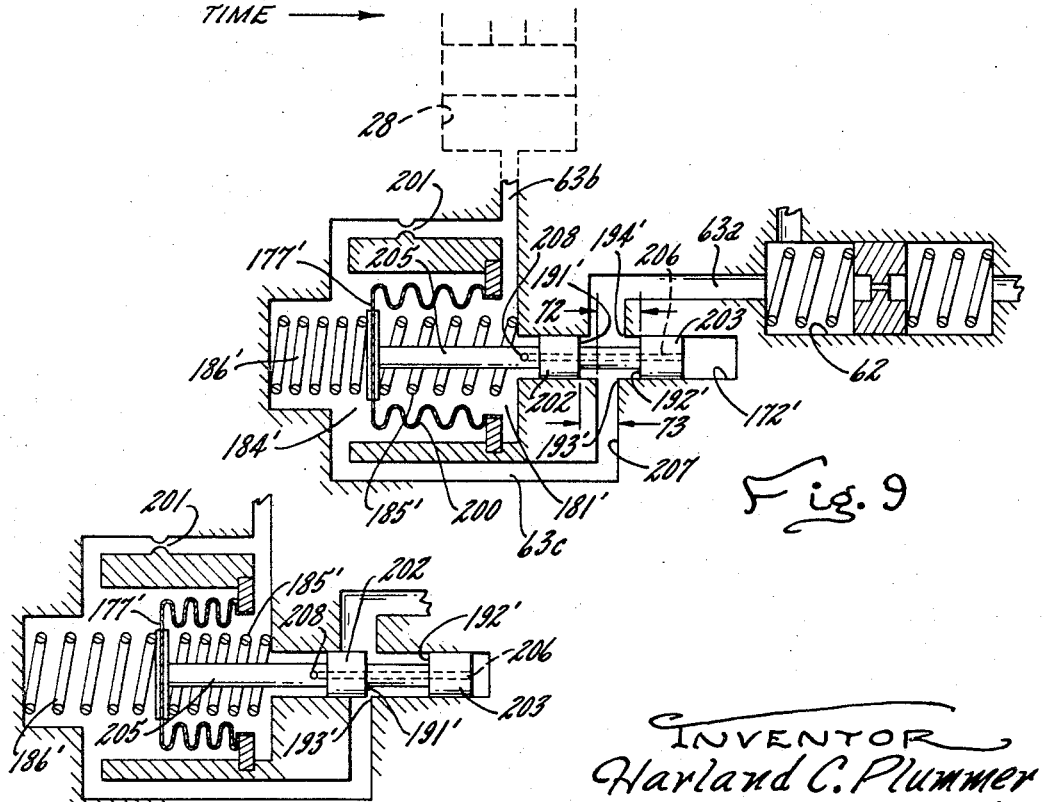

United States Patent Office 3,426,777
Patented Feb. 11, 1969

3,426,777
SPEED GOVERNOR WITH RATE LIMITER
Harland C. Plummer, Rockford, Ill., assignor to Woodward Governor Company, Rockford, Ill., a corporation of Illinois
Continuation-in-part of application Ser. No. 398,901, Sept. 24, 1964. This application July 17, 1967, Ser. No. 659,833
U.S. Cl. 137—18           32 Claims
Int. Cl. F01b *25/04;* F01d *17/02;* F16k *31/12*

ABSTRACT OF THE DISCLOSURE

A selectively adjustable all-speed hydraulic speed governor varies the energization of a fuel valve servo to maintain operation of a gas turbine at a steady state speed determined by the governor speed setting. Associated with the governor is a device which acts automatically after a wide change in the governor speed setting or a large change in load on the prime mover to permit, as illustrated in FIG. 2, rapid movement of the fuel valve to a position which is a small speed increment (*b*) short of the position determined by the newly selected speed setting, this being followed by a slow rate (*e*) of fuel change until the prime mover has been brought to the new speed (*f*). The rapid fuel changes are determined by lost motions between a member which moves in unison with the valve and stops which are of the mechanical type in the species shown in FIGS. 1 through 4 and of the hydraulic type in FIGS. 5 through 10. After a rapid movement, the movement of the member to limit the slow and progressive change in fuel flow to the new speed setting is regulated by subjecting the member to the pressure of hydraulic fluid which leaks through a rate determining orifice until the member has been returned to its steady state position.

CROSS-REFERENCE TO RELATED APPLICATION

This application is a continuation-in-part of my application Ser. No. 398,901, filed Sept. 24, 1964, now abandoned.

BACKGROUND OF THE INVENTION

This invention relates to a governor adjustable to different speed settings and operable to regulate the speed of a prime mover such as a gas turbine by adjusting the position of a servo actuated fuel flow regulator in response to deviations in the prime mover speed relative to the speed setting of the governor. The invention has more particular reference to such a governor incorporating a means for limiting independently of prime mover operating conditions the rate of change of the fuel flow in response to a large load change or a substantial change in the speed setting of the governor beyond normal load changes and thus limit the fuel to permissible and safe limits during the ensuing acceleration and deceleration of the prime mover.

SUMMARY OF THE INVENTION

The general object of the present invention is to provide a fuel regulator of the above character in which, as compared with prior similar regulators, reduces substantially thermal shocking of the prime mover incident to changing the fuel flow following each wide change in governor speed setting and this, without objectionably prolonging the time required for changing the fuel flow for each new speed setting. This is accomplished by combining with the speed governor a limiting device which regulates the governor action following a change in its speed setting and operates automatically to provide rapid movement of the regulator in the direction of the setting change and through a small and safe increment or step short of the newly selected speed and then to continue the flow change progressively in the same direction but at a substantially reduced rate until the prime mover has crept to the newly selected speed. Such control of the flow changes occur during both accelertion and deceleration of the prime mover in response to increases and decreases in the governor speed setting.

In the improved limiting device, a member moved back and forth in unison with the fuel regulator coacts with stops to form lost motions which determine the lengths of rapid steps of fuel change following increases and decreases in the governor speed setting. Continued movement of the regulator at the slow and limited rate after and beyond the rapid change is governed by the flow through an orifice of pressure fluid to which the member is subjected. In the specie of FIGS. 1 to 4, the member is connected mechanically to the fuel valve servo and the stops act positively in limiting the rapid motions of the member before the orifice comes into play to limit the rate of continued fuel change. In FIGS. 5, 6 and 7 the rate control member responds to pressure changes in the governor output line leading to the fuel servo and the stops are of the hydraulic type including pressure responsive valves which become effective and coact with the orifice to meter the transfer of fluid relative to the servo and maintain substantially constant the further slow rate of fuel change until the newly selected governor setting has been attained.

BRIEF DESCRIPTION OF THE DRAWINGS

FIGURE 1 is a schematic view and hydraulic circuit diagram of one form of a gas turbine speed regulating system embodying the improved fuel rate limiter.

FIG. 2 is a chart of fuel flow vs. time by the improved control.

FIG. 3 is a part of FIG. 1 showing moved positions of the parts.

FIG. 4 is a view similar to a part of FIG. 1 showing a modification.

FIGS. 6 and 7 are views of different parts of FIG. 5 showing different positions of the rate limiting member.

FIG. 8 is a fuel flow vs. time chart for the control shown in FIG. 2.

FIGS. 9 and 10 are views similar to FIGS. 5 and 6 showing a modification of the limit device of FIG. 5.

DESCRIPTION OF THE PREFERRED EMBODIMENTS

Figure 5:
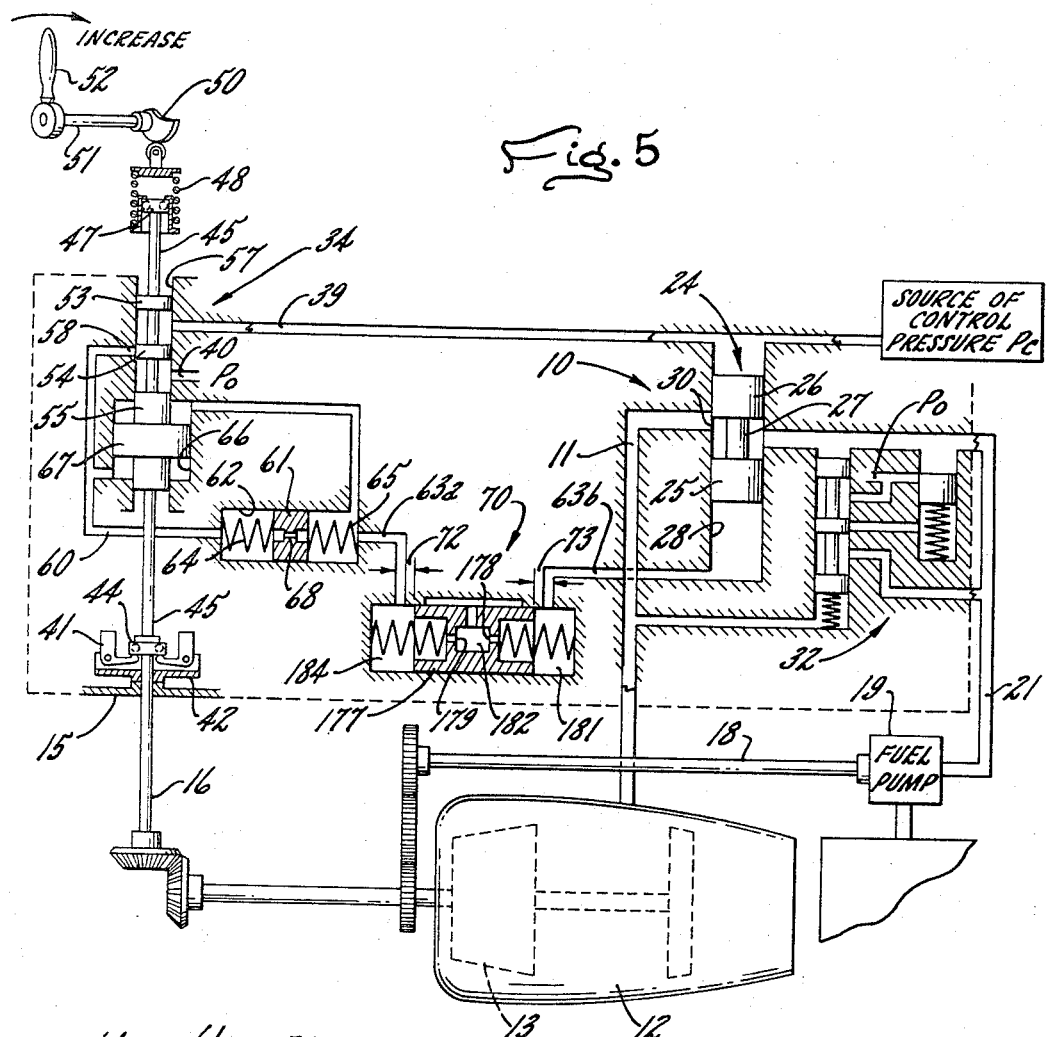
FIG. 5 is a view similar to FIG. 1 showing another and preferred specie of the present invention.

In the forms shown in the drawings, the invention is incorporated in a governing system for adjusting the opening of a valve 10 to meter the flow of liquid fuel under pressure to a passage 11 leading to the burners of a gas turbine 12 driving the usual rotary compressor 13 so as to maintain constant speed of the turbine during steady state operation but optimum and safe changes in fuel flow after wide adjustments in the selected turbine speed. The valve and the parts governing its operation are designed to fit compactly within a liquid containing casing indicated at 15 and having various passages, guides and bearings whose cross-sections are indicated by the hatching. The casing is clamped to the exterior of the prime mover whose main shaft is suitably coupled to a shaft 16 extending into the casing. Another extension 18 of the turbine shaft is coupled to the main pump 19 which delivers fuel at a high pressure into a passage 21 leading to the inlet of the main valve 10.

Herein, the fuel regulator or valve 10 and its actuating servo 24 comprise pistons 25 and 26 of equal size fixed to and axially spaced along a rod 27 and slidable in a cylinder 28 and biased in the fuel-decreasing direction by fluid at a pressure Pc applied to the rod end of the piston 26. The latter uncovers varying amounts of a port 30 according to position of the servo piston 25 as determined by the changing pressure in the head end of the cylinder 28. Suitable and conventional means indicated at 32 is provided to maintain a constant pressure drop or metering head across the main valve 10 in order that the position of the servo piston 25, as controlled by the governor, will at all times correspond closely to the prevailing rate of fuel flow.

Hydraulic fluid at a high pressure indicated at various points as Pc is derived from any suitable source within the casing 15. The space within the latter may be maintained at any desired substantially lower pressure indicated at various points as Po. The energization of the fuel valve servo 24 is controlled during steady state operation of the prime mover by admitting high pressure fluid to or releasing the same from the servo under the control of an all-speed governor 33 which is of the hydraulic type in the present instance and adapted for isochronous or constant speed operation. It comprises a pair of flyweights 41 upstanding from and pivoted on a ball-head 42 which is journaled in the casing 15 and driven from the shaft 16. Inwardly projecting toes on the flyweights act through a bearing 44 to axially position a stem 45 bearing upwardly against the inner race of a bearing 47 whose outer race abuts one end of a compression type spring 48 abutting at its other end against the follower of a cam 50 fast on a shaft 51. By turning a throttle 52 and the shaft 51, the stressing of the spring and the speed setting of the governor may be varied as desired.

The flow of fluid to and from the servo 24 is controlled by a valve 34 comprising lands 53, 54 and 55 axially spaced along the stem 45 and slidable in a cylinder 57 communicating between the lands 54 and 55 with the normally low pressure passage 40 and between the lands 54 and 53 with the normally high pressure passage 39. The land 54 cooperates with a port 58 to form the governor valve 34 for blocking the port when the flyball force balances the speeder spring force as shown in FIG. 1, for admitting fluid at the high pressure Pc to a passage 60 when the stem 45 is lowered in response to a detected fall in speed, and for releasing fluid from this passage when the turbine speed increases above the governor speed setting and raises the land 54 above the centered or on-speed position.

Changes in the fluid pressure in the passage 60 as controlled by the governor valve 34 are communicated to the cylinder 28 of the main fuel valve servo 24. Herein this is accomplished through the medium of a piston 61 slidable in a cylinder 62 connected at opposite ends of the passage 60 and a passage 63 leading directly, in the forms shown in FIGS. 1 to 4, to the head end of the servo cylinder 28. The piston 61 is urged toward a centered position by oppositely acting compression springs 64, 65. For producing isochronous operation of the turbine under steady state conditions, opposite ends of the cylinder 62 are cross-connected with opposite ends of a cylinder 66 in which a piston 67 slides. This piston is fast on the land 55 of the pilot valve plunger 45 which receives a so-called compensating force following each speed change thus causing a change in the position of the piston 67 and a consequent change in the compression of one of the springs 64, 65. Then, this force or pressure differential is dissipated gradually by leakage of the fluid between opposite ends of the cylinder 62 until the pressures therein are again equalized. In the present instance, such leakage is through a restricted passage 68 extending axially through the piston 61.

In operation of the systems shown in FIGS. 1 to 4, when the land 54 in response to a speed decrease below the prevailing speed setting of the governor is lowered from its neutral position opening the port 58, fluid at Pc will flow into the passage 60. The pressure increase moves the piston 61 downwardly compressing the spring 65 and forcing fluid out of the remote end of the cylinder 62 into the servo cylinder 28. The servo piston 25 is thus moved upwardly in the fuel-increasing direction against constant fluid pressure on the upper end of the piston 26. Conversely, a detected rise in speed causes the valve land 54 to be raised above the port 58 allowing fluid to escape to the low pressure line 40 thus decreasing the pressure in the passage 60. This allows the piston 61 to move under the higher pressure existing in the servo cylinder 28 thereby compressing the spring 64 and allowing the servo piston to move downwardly in the fuel-decreasing direction.

In response to either of the correcting actions above described, a pressure difference develops between the valve controlled passage 60 and the servo passage 63, the differentials being in opposite senses depending on whether the speed rises above or falls below the governor setting. The pressure differential is always in a direction to restore the valve stem 45 to its neutral position. This drooping characteristic is then dissipated gradually by fluid leakage through the restriction 68 until normal speed has been restored under the changed load. The action results in the fuel valve 24 taking a new position without a permanent change in the engine speed. True isochronous operation is thus achieved with the result that for a fixed setting of the throttle and during small or relatively slow load changes, the fuel valve is opened and closed within a narrow range or slow enough to avoid exceeding the rate of fuel change which is safe and permissible for the prime mover being controlled.

In accordance with the present invention and under the foregoing steady state conditions, the operation of the governor is unrestrained. But when the position of the throttle 52 is changed substantially or when a large change in the load occurs, the governor is allowed to produce only a short and permissible abrupt fuel change after which its action is restrained and the change in fuel flow is permitted to be continued by the governor at a slow and controlled rate until the newly selected speed of the prime mover is attained, normal steady state control by the governor then being resumed. Such limiting action is achieved through a device 70 which remains inactive during normal steady state adjustments of the fuel flow by the governor above described and at fixed speed settings of the latter but, after a short and measured abrupt increment of fuel change by the governor following substantial change in its speed setting, comes into play to control the continued movement of the fuel servo and schedule the further change until the turbine has been accelerated or decelerated to the speed determined by the changed speed setting of the governor.

Generally stated and in the forms shown in FIGS. 1, 3 and 4, the limiting device for thus restraining the governor servo 24 includes a second power servo 71 which is held inactive during steady state governor control and short but rapid increaments of fuel change are permitted by coupling the governor and limit servos 24 and 70 through the medium of lost motions 72 and 73 which operate during acceleration and deceleration respectively. These are adjustable in length to allow the abrupt fuel changes to be varied to suit different prime movers.

While the limit servo 71 may take various forms and its speed regulated in different ways, it preferably comprises a fluid filled cylinder 74 and a piston 75 slidable therein and coupled to the governor servo through the lost motion connections, a link 76 and a bell-crank 77, one arm of which is connected to the piston rod 27 of the fuel servo. The lost motion 73 is provided by the normal spacing (FIG. 3) between an abutment or stop 78 formed by a snap ring seated in one end of a cylindrical tube 80 and the head 81 of a screw 82 threaded into the outer end of a plunger 83 which slides in the tube. The other lost motion is determined by the normal spacing of a stop formed by the end 84 of the tube 80 from the end 85 of a screw 86 threaded through the plunger along one side thereof. By adjusting the screws relative to the plunger, the lengths of the lost motions may be varied as desired. The link 76 projects into the open end of the tube 80 and is pivotally connected to the plunger 83 at 87 and between the screws.

In the form shown in FIGS. 1 to 3, the tube 80 extends through and is slidable in a head 88 closing one end of the servo cylinder 74. The opposite end is closed by a wall 90. The tube 80 constitutes the rod of the piston 75 and its inner end is reduced in diameter and fixed at 90 to one end of the piston 75. With this arrangement, the plunger 83 remains disconnected from the piston 75 through the combined lengths of the two lost motions 72, 73. When either lost motion has been taken up by a longer than normal movement of the fuel servo piston 25 in one direction, the pistons become coupled together and move in unison during continued movement of the fuel servo in the same direction.

Such motion of the limit piston 75 by the fuel servo, upwardly during a fuel increase and downwardly as the flow is decreased, is permitted by the displacement of the liquid out of the corresponding end of the cylinder 74. In accordance with the present invention, this is accomplished by valves 91 and 92 which are opened selectively in the opposite movements of the plunger 83 relative to the tube 80 while one of the lost motions is being taken up. Herein the valve 91 includes a land 93 at one end of an annular space 94 around a tubular stem 95 rigid with and constituting an extension of plunger 83 and slidable in an axial bore 96 which extends through the inner end of the tube 80, the piston 75 and a tube 97 closed at its end 98 and projecting axially from the opposite end of the piston.

To form the valve 91, the land 93 coacts with ports 100 angularly spaced around the stem 95 on one side of the piston 75. Similar ports 101 in the tube on the opposite side of the piston cooperate with a land 102 on the stem beyond the other end of the passage 94 to form the valve 92. Opening of either one of the valves 91 and 92 connects the corresponding end of the cylinder 74 to a passage 103 extending along the stem 95 and communicating with the passage 94 through a port 104. A port 105 near the opposite end of the stem connects the passage 103 with the space 106 between the plunger and the inner end of the tube 80, this space communicating through a passage 107 in the plunger with the low pressure area within the governor casing and surrounding the cylinder 74.

In another of its aspects, the invention contemplates regulating the speed of movement of the piston 75 during its fuel limiting action so that, after each abrupt and permissible increment of fuel change, the rate of continued increase or decrease is limited properly and maintained substantially constant irrespective of the extent of the load variation or speed setting that brought the limit device into action. This is accomplished by regulating and maintaining constant the displacement liquid by the piston 75 after one of the lost motions has been taken up. For this purpose and in the form shown in FIGS. 1 and 3, opposite ends of the cylinder 74 communicate through passages 110 and 111 with regulators 112 and 113 each of which operates automatically, after one end of the cylinder has been connected to the drain space by the opening of one of the valves 91 or 92, to meter liquid from the high pressure source Pc into the other end of the cylinder at a restricted and constant rate determined by an orifice 114.

In the form shown, an orifice 114 for the regulator 113 in the end of a cup-like piston 115 is slidable in a cylinder 116 and urged away from the passage 111 by a spring 117 compressed between the cup and an abutment 126. The latter is supported by a screw 118 threaded through the cylinder end for adjusting the abutment axially to vary the force of the spring. A short rod 120 projects from the end of the cup for engagement with the ball 121 of a regulating valve 122 whose casing 123 communicates with the pressure source Pc. A light spring 124 acting in compression urges the ball toward its seat 125 with a force substantially less than that of the spring 117 so that the valve will be held open by the piston 115 when both of the valves 91 and 92 are closed, as shown in FIG. 1. With the valve 122 open, the force of the spring 117 plus the pressure in the rod end of the cylinder 74 as exerted on the open end of the cup 115, is balanced against a pressure Pr exerted against the end of the piston 115. As a result, the piston 75 will move back and forth with increases and decreases in Pr and vary the opening of the valve 122 to maintain a constant pressure drop across the orifice 114 as determined by the adjustment of the spring 117. Thus, the rate of flow through the orifice is constant irrespective of the prevailing value of Pc.

The regulator 112 is of the same construction and its parts are indicated by corresponding but primed reference numbers.

OPERATION

Let it be assumed that the speed setting of the governor is fixed and that the latter is operating steady state to maintain a constant speed of the prime mover, the fuel flow being constant as indicated at $a$ (FIG. 2) except for small changes required to correct for normal load changes. When the prime mover speed corresponds precisely to the governor speed setting, the parts of the limiting device 70 will be poistioned as shown in FIG. 1, the valves 91 92 being closed. Now, if the throttle is moved to substantially increase the governor speed setting, for example to a value corresponding to a fuel rate of $c$ (FIG. 2), the governor will respond by increasing the energization of the servo 24 to initiate further opening of the fuel valve 10. The increased force of the servo is also applied through the bell-crank 77 to the plunger 83 thus initiating movement of the latter relative to the piston 75 (to the right in FIG. 1), as permitted by the lost motion 73. The land 93 on the plunger stem 95 is thus raised above the ports 100 as shown in FIG. 3 thereby connecting the upper end of the cylinder 74 to the drain area through the passage 107 to permit the escape of liquid and causing a reduction in pressure in the upper end of the cylinder 74 and in the spring end of the regulator cylinder 116. As a result, the piston 115 is moved to the left because of restriction 114 thus allowing the valve 122 to throttle under the force of its spring 124. The piston 75, thus freed for upward movement (FIG. 3), starts to move at a rate determined by the regulated flow of liquid through the regulator 112 and into the lower end of the cylinder 74.

With the piston 75 initially disconnected from the governor servo through the lost motion 73, the governor will increase the fuel flow abruptly as indicated at $b$ (FIG. 2) until the lost motion is taken up and the piston 75 becomes effective at $d$ to restrain the continued opening of the fuel valve by the governor servo. Such restraint is exerted because the governor servo, although it continues to exert an upward pull on the piston 75, tends to draw a vacuum in the lower end of the cylinder 74, its force is insufficient to overcome such vacuum which is exerted on the lower end of the piston 75. The latter is made substantially larger than the piston 25 of the fuel servo so that the latter is overcome and permitted to continue the opening of the fuel valve at a rate $e$ (FIG. 2) determined by the flow through the orifice 114' into the cylinder 74.

The increase in the fuel flow thus limited by the flow of pressure fluid into the lower end of the cylinder 74 through the restriction 114' continues to the point $f$ at which the speed of the prime mover equals the prevailing speed setting of the governor. At this time, the pilot valve 34 will be closed thus holding the servo piston in fixed position. But since the valve 91 of the limit servo is still open and the upper end of the cylinder 74 connected to the drain areas, high pressure fluid will continue to flow into the lower end of the cylinder causing the upward movement of the piston 75 to continue thus moving the abutment 78 away from the head of the screw 82 and raising the ports 100 of the valve 91. This motion continues until these ports are covered by the land 93 to close the valve 91 thus disconnecting the upper end of the cylinder 94 from the drain whereupon the spring again becomes effective to open the ball valve 122. Thus, after the control of the fuel valve 10 is transferred back to the governor at $f$, operation of the limit servo 71 is continued long enough to restore the piston 75 to its steady state or centered position, reestablish the lost motion 73, and condition the servo for allowing another abrupt fuel change before the device 70 again imposes a limiting action.

Through the provision of the lost motion 72, the valve 92, and the second flow regulator 112, the limit device 70 above described is made reversible and adapted to provide the same limiting action in response to a decrease in the governor speed setting to decelerate the prime mover. Assume, for example, that the throttle is turned counter-clockwise to allow the pilot valve stem 45 to rise and deenergize the servo 24 so as to select a new speed corresponding to a fuel flow 8. The ensuing rapid valve closing movement $h$ of the servo 24 is accompanied by downward movement of the plunger 83 until the lost motion 72 is taken up, the limit device 70 coming into action at $j$ (FIG. 2). The valve 92 is thus opened connecting the lower end of the cylinder to the drain area through the passage 107.

With the parts thus positioned, high pressure fluid flows into the upper end of the cylinder 74 through the restriction 114. This restrains the piston 75 to a limited rate thus metering the fuel reduction as indicated at $k$ until at $l$, the flow corresponding to the newly selected governor speed setting is attained. Then, the governor is blocked by the centering of the pilot valve 34 whereupon the piston 75 continues to move downwardly by the fluid flow through the restriction 114 until the valve 92 is reclosed and the lost motion 72 reestablished. The limit device is thus inactivated and the control of the fuel valve is returned to the governor which continues the isochronous operation of the prime mover at the new and reduced speed setting of the throttle.

Disposal of the selecting valves 91, 92 within and along the axis of the limit servo 71 contributes to the overall compactness and simplicity of construction of the governor incorporating the improved limit device in the preferred form above described. Other configurations such as that shown in FIG. 4 may be preferable under certain conditions of service use.

Modification FIG. 4

In FIG. 4, certain of the parts corresponding to those in FIGS. 1 to 3 are given the same reference numerals. In this instance, the lost motions 72, 73 are between a pin 130 projecting laterally from the rod 131 of the piston 75 and the screws 82, 86 which are threaded in opposite directions into the legs of a fork 132 on one end of a lever 133 fulcrumed at 134 intermediate its ends with its other end pivotally connected at 135 to the rod 27 of the fuel servo piston 25. Valves 136, 137 are actuated by movements of the piston 75 in either direction out of a normally centered position to connect a passage 129 from the source of high pressure Pc to one end of the cylinder 74 and the other end to flow restricting orifices 138 or 139 leading to the low pressure or drain area 140, the rate of flow of fluid out of the cylinder being maintained at a constant rate by automatic regulators 141, 142.

The passage 129 communicates with a cylinder 143 between lands 144, 145 on a valve stem 152 cooperating with the ports 146 and 147 to form the valves 136, 137 which respectively control communication between the piston 75 and passages 148 and 149 leading to the valves 141 and 142 which operate to maintain constant pressure drops across associated orifices 138, 138 which, like the orifices 114, 114' above described restrict the rate of displacement of fluid by the piston 75. Each regulating valve includes a piston 150 slidable in a cylinder 151 and cooperating at one end with an inlet port 153 and subject at its other end through a passage 155 to the pressure on the upstream side of the associated restriction 138. Pressure in the low pressure area beyond the orificie is applied to the outer end of a piston 154 which is also urged by a spring 156 in the valve opening direction. The constant pressure drop across the orifice is determined by the force of the spring. The valve 142 for maintaining a constant flow through the orifice 139 when the latter is active is of the same construction.

The stem 152 of the valves 136, 137 is connected at 157 intermediate the ends of a lever 158 pivotally connected at one end 159 to the rod 27 of the fuel servo and at the other end 160 to the rod 131 of the piston of the limit servo 71 so that the valves are actuated in the same manner as the valves 91, 92 above described after one of the lost motions 72, 73 has been taken up. In this instance, however, the high pressure source is connected directly by one of the valves 136, 137 to one end of the cylinder 74 to provide a force aiding the governor servo while the other valve connects the other end of the cylinder to the corresponding orifice 138 or 139 which restricts the flow of the fluid forced out of the cylinder by the piston 75.

The parts will be positioned as shown in FIG. 4 when the governor is on speed. Now, if the speed setting is increased to accelerate the prime mover, the lever 133 will be rocked quickly by the servo 24 in a direction to take up the lost motion 73 thus allowing the abrupt increase $b$ (FIG. 2) in fuel by action of the governor, the amount being determined by the amount of the lost motion. With the pin 130 engaging the screw 82, the governor servo will be coupled to the piston 75 of the limit servo. The abrupt advance of the governor servo also raises the stem 152 thus opening the valve 136 to connect the high pressure source to the head end of the cylinder 74 and the valve 137 to connect the rod end of the cylinder to the orifice 139 through the valve 142.

Under the high pressure, the piston 75 is moved downwardly at a rate controlled by the outflow of fluid through the orifice 139. Since the governor servo 24 is locked by the pin 130 and the piston 75, the rate of opening of the fuel valve by the governor is correspondingly limited and, as before, increases slowly as indicated at $e$ (FIG. 2). Such increase is interrupted at $f$ by the governor when the prime mover has been accelerated to the speed corresponding to the new speed setting. But, since the valves 136, 137 are still open and the governor servo is stopped by closure of the governor pilot valve, the piston 75 and the pin 130 continue to move downwardly and away from the screw 82 and also effect progressive reclosure of the valves 136, 137. When the latter become fully closed, the lost motion 73 will be reestablished and the limit servo will be inactivated and uncoupled from the governor servo. Exclusive control of the fuel valve is thus returned to the governor.

As in the construction first described, the modified construction acts in a similar manner in response to a substantial decrease in the governor speed setting, the valves and pistons moving in directions opposite to those above described. Thus, the fuel valve is permitted to close abruptly in a short increment $h$ and then to continue closing at the slow and limited rate $k$ until the newly selected reduced speed of the prime mover is attained.

In both of the forms above described, it will be observed that the valves 91, 92 or 136, 137 by which the limit device 70 is controlled are closed only when the governor is on speed and its servo stopped. Thus, during the small movements of the governor servo to correct for normal load changes on the prime mover, one of these valves will be opened and motion of the piston 75 initiated and part of one of the lost motions will be taken up.

But the limit servo remains ineffective and does not restrain the action of the governor so long as the load change on the prime mover or a change in the governor speed setting does not require a fuel change greater than that corresponding to one of the lost motions 72, 73. Thus, the piston 75 will be moved back and forth within the lost motion range as the fuel rate is changed by the governor during normal steady state operation.

*Modification (FIGS. 5 to 7)*

The parts of the governor, the servo, and the fuel valve are of the same general construction and operate in the same way as in the embodiments above described. Accordingly, the corresponding paths are indicated by the same reference numerals.

In the governor described above, the servo piston 26 is actuated by the transfer of pressure fluid back and forth through the closed passage 63 and into the cylinder 28 by movement of the buffer piston 61 to correct for a speed increase and out of the cylinder by the biasing force on the servo piston following detection of a decrease below the prevailing speed setting. The present invention, in a more specific aspect, takes advantage of such back and forth transfer of fluid and greatly simplifies the rate limiting device 70 by incorporating the same within the passage 63 and adapting the same for operation by pressure changes therein.

Generally stated, the device 70 of this preferred modification and also of the embodiment shown in FIG. 9 includes a piston 177 disposed within the passage between the buffer and servo cylinders 62, 28 and dividing the passage into closed chambers 181, 194 respectively communicating with the buffer and servo ends 63a, 63b of the passage and with each other through one or more orifices 178, 179 which determine the slow rates e and k (FIG. 7) of the fuel changes. The piston is centered in the passage by opposing springs 185, 186 and carries the movable valve elements 191, 192 which coact with stationary elements 193, 194 to form valves that provide hydraulic stops which define the lengths of the lost motions 72, 73 and therefore the amount of the rapid steps b and h of the fuel changes following a substantial change in the governor speed setting.

In the preferred construction (FIGS. 5 to 8), the piston 177 is a cylindrical block slidable back and forth in a cylinder 174 communicating near its closed ends with ports 175, 176 at the inner ends of the servo and buffer passages 63b and 63a. The springs 185, 186 are compressed between opposite ends of the piston and the closed ends of the cylinder to bias the piston to a centered position (FIG. 5) in which the piston is disposed during steady state operation in which the piston shifts back and forth short distances in unison with the buffer piston as the governor corrects for normal load changes. Opposite end portions of the piston form lands which cooperate with the piston ends 191, 192 and the ports 175, 176 to form the valves that effect stopping of the piston after one or the other of the lost motions 72, 73 has been taken up to terminate a rapid step b or h in the fuel change. The outer edges 193, 194 of the ports 175, 176 are spaced from the ends 191, 192 of the piston in the centered position thereof to impart the desired lengths to the lost motions 72, 73.

To provide for varying the rates of the continued and limited changes b and k to the newly selected governor settings, provision is made for controlling these rates by separate orifices 178 and 179 (FIG. 5) and rendering these operative selectively in response to the movements of the piston 177 away from the centered position. To this end, the orifice 178 is disposed between the servo end 181 of the cylinder 174 and a passage 182 within the piston and opening outwardly in continuous registry with an inwarly opening longitudinally extending slot 183 shorter than the length of the piston and formed in the wall of the cylinder. Similarly, the orifice 179 is disposed between the passage 182 and the governor end 184 of the cylinder 17. In the centered position of the piston (FIG. 5), the slot is covered so that the chambers 181, 184 are connected through the recess 182 and both of the orifices 178, 179 which thus act like the orifice 68 of the buffer piston 61 during the back and forth transfer of fluid to and from the servo under steady operation of the governor.

Figure 6:
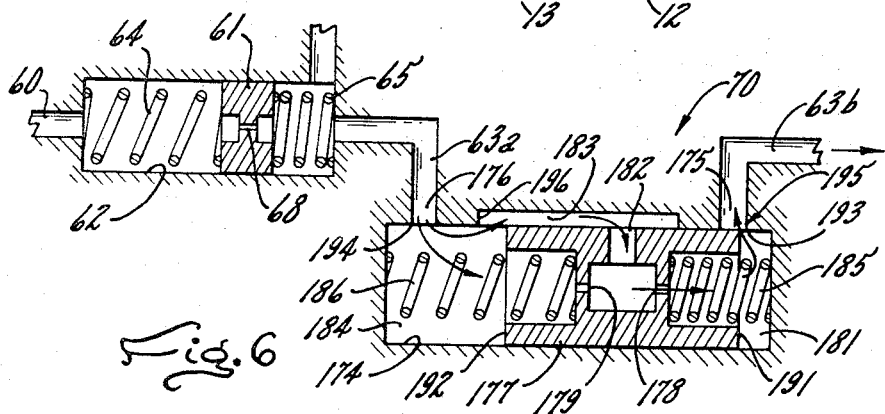

In response to movement of the piston to the position shown in FIG. 6 following a wide increase in the governor speed setting, the left end of the slot is uncovered and the passage 63a and chamber 184 are connected directly to the passage 182 thus rendering the orifice 178 alone effective for regulating the ensuing limited flow change e. Reverse movement of the piston to the position in FIG. 7 following a decrease in speed setting uncovers the other end of the slot thus rendering the orifice 179 alone effective in limiting the ensuing slow fuel change k.

As will appear more fully later, the valve 191, 193 controlling the acceleration step b and the valve 192, 194 that terminates the deceleration step h coact with the springs 185, 186 respectively and the active orifice 178 or 179 to regulate and maintain constant the rates of the slow fuel changes e and k. Thus, after hydraulic stopping of the piston as it comes within a few thousandths of an inch of the port edge 194 or 195, the active valve 191, 193 or 192, 194 is opened and closed in response to pressure changes in the chambers 181 or 184 to maintain a constant pressure drop across the active orifice 178 or 179 and thereby meter the continued flow of fluid to or from the servo.

For the reasons given above and in order to produce a desired flow vs. time relation (FIG. 8), there is a general correlation of the sizes of the pistons 61 and 177, orifices 178, 179 and scaling of the springs 185, 186. These elements also influence the extent of the rapid steps b and h of fuel change as well as the rates e and k of further change to the newly selected governor speed settings. In a typical installation and with a buffer piston 61¾ of an inch and the orifice .030 of an inch in diameter, a ¾-inch piston 177 may be used with the orifices 178, 179 about .025 of an inch in diameter depending on the desired slow rates e and k of fuel change.

The amount the fuel changes during the rapid acceleration and deceleration steps b and h is determined by the spacing of the piston ends 191, 192 from the remote sides 193, 194 of the ports 175, 176. For example, the fuel change during a deceleration step h may, as shown in FIG. 8, be made greater than the acceleration step b by increasing the distance between the piston end 192 and the orifice edge 194 relative to the corresponding valves at the other end of the limiting device 71.

OPERATION

During steady state operation under the normal control by the governor as indicated at a (FIG. 8), the ports will be positioned as shown in FIG. 5. The pistons 61 and 177 of the buffer and limit devices shifting short distances back and forth as pressure fluid is forced into and released from the passage 63ª to correct for small load changes and maintain turbine speed corresponding to the prevailing throttle setting.

Assume now that the throttle is swung to increase the force of the spring 48 an amount sufficient to select a new steady state fuel flow f. The valve land 54 is thus lowered admitting pressure fluid to the passage 60 forcing the buffer piston 61 instantly to the right and a corresponding amount of fluid through the passage 63ª and into the chamber 184 of the cylinder 174. The piston 177 is thus moved to the right and to the position shown in FIG. 6 against the force of the spring 185. In this movement, the end 192 of the piston is slid past the end 196 of the slot 183 thus establishing a bypass around the orifice 179 for the direct flow of fluid to the passage 182 and placing orifice 178 in exclusive control of the increase $e$ at the reduced and limited rate.

In response to the increased speed setting of the governor, the piston movement is instantaneous and continues until the end 191 of the piston passes nearly across the full width of the port 175 and comes close to and within a few thousandths of an inch of the outer edge 193 of the port 175 as shown at 195 on an exaggerated scale in FIG. 6. The piston is always stopped short of the edge 193 because, as the gap 195 is reduced, the pressure in the chamber 181 builds up reducing the downstream pressure drop across the orifice 178. When this drop balances the force of the spring 185, the movement of the piston is stopped thus interrupting the rapid increase $b$ in the fuel valve opening at $d$.

After the lost motion 73 has thus been taken up and the piston stopped hydraulically, the piston end 191 and the port edge 193 coact with the spring 183 to form an automatic valve for metering the continued flow of fluid to the servo cylinder 28 at a constant rate determined by the size of the orifice 178. That is to say, the piston is moved back and forth so as to maintain a constant pressure drop across the orifice and thereby a reduced but constant flow to the servo cylinder.

The fuel flow is thus increased at a slow constant rate indicated at $e$ until at $f$ the turbine attains the speed determined by the prevailing speed setting of the governor. This is evidenced by closing of the pilot valve 34 which, through the buffer system, results in a reduction in the fluid flow in the passage 63$^a$, the cylinder end 184, and the passage 182. As a result, the downstream pressure drop across the orifice 178 is reduced thereby allowing the spring 185 to move the piston 177 to the left and back to the centered position (FIG. 5) as determined by rebalancing the forces acting on the piston. This is accompanied by reclosing of the orifice selecting valve formed by the piston and the slot 183. In the continued steady state operation at $g$, the piston 177, loaded by the springs 185, 186, moves back and forth with the similarly loaded buffer piston 61 in response to load changes detected by the governor. Constant steady state operation continues while the throttle setting remains fixed.

Assume now that, during steady state operation, the throttle is shifted to select a substantially reduced turbine speed such as $m$. In response to the resulting release of pressure from the line 60, the pressure fluid is, under the biasing force on the servo piston 25, transferred reversely through the passage 63$^b$, the cylinder 174, the passage 63$^a$, and the buffer cylinder 62. As a result, the motions of the pistons 61 and 177 as above described are reversed, the piston 177 moving to the left and to the position shown in FIG. 7. The fuel flow is thus decreased rapidly at $h$ until the hydraulic stop formed by the valve 192, 194 becomes effective to limit the rapid fuel decrease at $j$. In such shifting, the cylinder end 181 becomes connected through the slot 183 directly with the passage 182 thus placing the orifice 179 in control of the termination at $j$ of the rapid fuel decrease $h$ and the continued decrease at the reduced rate $k$ until the fuel flow corresponding to the newly selected governor speed setting has been attained at $l$. Then and in response to the decreased pressure drop across the orifice 178 and toward the governor, the piston 177 is shifted back to the normal centered position (FIG. 5) and the valve slot 183 is recovered by the piston. The limit device 71 is again inactivated thus returning the control of the fuel flow exclusively to the governor for the steady state operation indicated at $m$.

*Modification (FIG. 9)*

The general construction and the operation of this embodiment are essentially the same as the preferred embodiment above described and accordingly the same but primed reference numbers are applied to the parts of the limiting device performing corresponding functions. The piston 177' is the closed end of an axially collapsible bellows 200 fixed around its opposite end and separating the chambers 181' and 184' which communicate directly and respectively with the governor and servo end portions 63$^a$, 63$^b$ of passage 63 between the buffer and servo cylinders 62 and 28. The rates of the slow flow change $e$ and $k$ are the same in this instance and are determined by the size of a single orifice 201 herein between the chamber 184' and the passage 63$^b$. The valve elements 191', 192' corresponding to the ends of the piston 177 in FIG. 5 are, in this instance, formed by the opposed ends of lands 202, 203 slidably disposed intermediate the ends of a cylinder 172' and spaced along a stem 205 which is fixed within the chamber 181' to the piston 177. These lands correspond to opposite end portions of the piston 177 in FIG. 5. The closed end portion of the cylinder beyond the land 203 communicates with the chamber 181' through a hole 206 extending through the lands and opening at 206$^a$ into the chamber 181'.

The lost motions 72, 73 are provided and the hydraulic stops for the piston 177' are formed by the coaction of the opposed land ends 191' and 192' with opposite side edges 193', 194' of a single port 207 communicating with the chamber 184' through a passage 63$^c$ and opening into the cylinder 172' opposite a port 207 at the end of the passage 63$^a$ from the buffer cylinder. In addition to forming hydraulic stops, the land ends and the port edges coact as before with the respective springs 185', 186' to form valves for metering fluid to and from the servo cylinder to maintain constant pressure drops across the orifice 201 during the slow fuel changes.

During steady state operation, the ports are positioned about as shown in FIG. 9, the land ends 191', 192' being centered relative to the port 207 by the balanced forces of the springs 185', 186'. Now, when the throttle 52 is swung to increase the governor speed setting to $g$ (FIG. 8), pressure fluid is forced from the buffer cylinder through the passages 63$^a$, 63$^c$ into the chamber 184' thus moving the piston 177' instantly to the position shown in FIG. 10 and causing a rapid increase in the servo pressure and of the fuel flow as indicated at $b$. In this position, the land 191' is disposed close to the edge 193' and the two then coact with the spring 185' to meter fluid to the passage 63$^c$ and maintain a constant pressure drop across the orifice 201 during the continued slow increase $e$ in the fuel flow and until the governor has been satisfied as the turbine attains the newly selected speed at $f$. Steady state operation at $g$ is thus resumed.

Similar action occurs to effect the rapid step $h$ of fuel decrease in response to a substantial decrease in the governor speed setting, this being followed by slow creeping at $k$ of the fuel reduction down to the newly selected speed $m$. In this instance, the piston 177' movement to the left from FIG. 9 is stopped hydraulically when the lost motion 72 has been taken up as the land end 191' reaches the edge 193' (FIG. 10). Then, the metering valve formed by this end and edge cooperate with the spring 186' to maintain a constant pressure drop across the orifice 201 and a constant flow of fluid into the buffer cylinder. The fuel reduction thus creeps at $k$ to the rate $m$ required for maintaining the newly selected governor setting.

I claim:

1. The combination of, a fuel regulator movable back and forth to vary the speed of a prime mover, an all-speed governor including a manually operable speed setter and a power servo operable in response to load changes on the prime mover to vary the position of said regulator and maintain operation of the prime mover at a steady state speed determined by the position of said speed setter, a member coupled to and movable back and forth with said regulator, a fluid filled cylinder, a piston slidable therein, two oppositely acting lost motion devices through which said piston and said member may be coupled together for movement in unison but remain uncoupled during steady state operation of said governor, two valves normally closed during said steady state operation and respectively opened in response to increases and decreases in the speed setting of the governor and the resulting movement of said member by the governor servo to change the fuel rate and take up the lost motion in one of said devices, each of said valves when open establishing connections for the flow of high pressure fluid into one end of the cylinder and the escape of fluid from the opposite end and thereby couple said piston directly to said member after the lost motion in one of said devices has been taken up, and orifice means interposed in and limiting the rate of displacement of fluid through said connections and the speed of subsequent movement of said piston whereby to restrain said governor servo and limit the continued change in fuel flow thereby until the prime mover attains the newly selected speed.

2. A fuel regulator as defined in claim 1 in which the motion of said piston initiated by the opening of one of said valves is continued after the new prime mover speed is attained and until both of said lost motions have been restored to normal steady state lengths.

3. A fuel regulator as defined in claim 1 in which said governor servo includes a piston whose effective area is substantially smaller than that of said first mentioned piston.

4. A fuel regulator as defined in claim 1 in which said piston is on a tubular rod having ports on opposite sides of the latter opening into opposite ends of said cylinder, and said valves comprise lands on a stem slidable in said tubular rod and coacting with said ports.

5. The combination of, a member movable back and forth to vary the flow of fuel to a prime mover, an all-speed governor having a selectively adjustable speed setter and operable to detect changes in the load on said prime mover and position said member to correct for such load changes and maintain operation of the prime mover within a narrow steady state speed range while said speed setter is disposed in a selected position, means for sensing a change in the position of said speed setter to a speed beyond the prevailing steady state speed range, and mechanism controlled by said sensing means following a speed setting change to effect rapid movement of said member by said governor in the direction of the changed speed setting and through a predetermined small speed increment beyond the former steady state range but short of the position corresponding to the newly selected speed determined by said setter and then to continue movement of the member progressively and in the same direction at a substantially slower and limited safe rate until the prime mover has been brought to said newly selected speed.

6. A fuel regulator as defined in claim 5 in which said governor incorporates a power servo which adjusts the position of said member during said steady state operation and also during said abrupt motion and said mechanism operates to restrain the action of such servo and thereby limit the subsequent change in fuel rate by the governor until said newly selected prime mover speed is attained and said steady state operation resumed.

7. A fuel regulator as defined in claim 5 in which the extent of said rapid movement of said member is determined by the length of a lost motion in a connection between the member and said rate limiting mechanism.

8. A speed regulator as defined in claim 5 in which said member is actuated by a power servo associated with said governor and the limited rate of movement of the member is controlled by a second power servo acting to restrain the governor servo and having a limited lost motion connection with said member.

9. A speed regulator as defined in claim 5 in which said member is moved in opposite directions by a reversible power servo associated with said governor and said rate limiting mechanism includes a second reversible power servo acting in opposition to said governor servo and connected to said member during steady state operation through two lost motions the slack in which is taken in response to increases and decreases respectively in the speed setting of said governor.

10. A ful regulator as defined in claim 9 in which said second servo comprises a fluid filled cylinder and a piston slidable therein and coupled to said member through said lost motion connections and including a flow restricting orifice limiting the displacement of fluid in the cylinder to determine the rate of movement of said regulating member when the member is coupled directly to said piston for effecting the slow rate of change in the fuel flow.

11. A fuel regulator as defined in claim 10 in which, during the limited rate of fuel change as determined by said second servo, liquid is permitted to escape freely from one end of said cylinder while liquid at a relatively higher pressure is admitted to the other end of the cylinder through an orifice whose size determines the limited rate of the fuel change.

12. A fuel regulator as defined in claim 10 in which, during the limited rate of fuel change under the control of said second servo, liquid at high pressure is delivered into one end of said cylinder and liquid from the opposite end of the cylinder escapes through an orifice whose size determines the limit rate of the fuel change.

13. A fuel regulator as defined in claim 10 in which the speed of movement of the piston of said second servo is determined by the displacement of liquid by such piston through an orifice whose size determines the limited rate of the slower fuel change.

14. A fuel regulator as defined in claim 13 including means operating automatically to maintain a constant drop in pressure across and a constant flow of liquid through said orifice.

15. In a fuel regulator having a valve member movable back and forth to vary the flow of fuel to a prime mover, a power servo for actuating said valve member, an all-speed governor including a selectively adjustable speed setter and means driven in synchronism with the prime mover and operable to detect changes in the load on the prime mover and vary the energization of the servo and position of said valve member so as to correct for such load changes and maintain operation of the prime mover within a narrow steady state range while the speed setter is disposed in a selected position, the improvement comprising mechanism actuated in response to a change in the position of said speed setter to a speed outside of the prevailing steady state range to effect rapid movement of said member by said governor in the direction of the changed speed setting and through a predetermined small speed increment beyond the former steady state range but short of the position corresponding to the newly selected speed determined by said setter and then to continue movement of the valve member progressively and in the same direction at a substantially slower and limited safe rate until the prime mover has been brought to said newly selected speed, said mechanism including an element movable back and for thin unison with said valve member during said steady state and rapid movements, a stop spaced along the path of movement of said element and interrupting the movement thereof to terminate the rapid movement of said valve member by the governor, and means operable after said element encounters said stop to limit the continued advance of the valve member by said governor to a reduced rate including orifice means subjected to hydraulic pressure and sized to pass fluid therethrough at a flow rate corresponding to said reduced rate of advance of the valve member.

16. A prime mover fuel regulator as defined in claim 15 in which said mechanism operates in response to both increases and decreases in the changed speed selected by said speed setter and the reduced rates of continued advance of the valve member during acceleration and deceleration of the prime mover are determined by the flow of said pressure fluid through separate orifices.

17. The combination of, a fuel regulator biased in one fuel changing direction and movable back and forth to vary the speed of a prime mover, a hydraulic servo for moving the regulator in the opposite direction as the servo pressure is increased, a fluid filled passage communicating at one end with said servo, an all-speed governor including an adjustable speed setter and means operable in response to opposite changes in the load on said prime mover to force fluid into or release fluid from the opposite end of said passage, a piston disposed within and dividing said passage into first and second chambers and movable back and forth to effect the transfer of fluid into and out of said servo as the pressure supplied by said governor increases and decreases, an orifice establishing continuous but restricted communication between said chambers, spring means exerting oppositely acting biasing forces on said piston to maintain the same in a centered position during steady state control of the servo pressure by said governor while resisting movement of the piston out of such position, and a valve controlling the flow of fluid into and out of one of said chambers to and having an element movable back and forth with said piston and maintaining the valve open while the piston is in said centered position and during a predetermined movement away from such position in the valve-closing direction whereby to permit of a rapid change in the servo pressure by action of the governor and movement of the piston accompanied by an increase in a corresponding one of said biasing forces, said valve, when said element reaches a position substantially closing the valve, acting as a hydraulic stop to interrupt the advance of the piston while thereafter coacting with the increased biasing force and piston to meter the further flow of fluid through the valve relative to said servo at a reduced rate determined by such biasing force on the piston and the size of said orifice.

18. The combination defined in claim 17 including a second valve of the same construction as said first valve and acting in the same way in response to reverse movement of said piston from said centered position following a wide and opposite change in the governor speed setting to cause rapid movement of the piston and a corresponding change in the position of said fuel regulator short of the new governor setting, the movable element of said second valve, when reaching substantially closed position, coacting with said piston, the increased biasing force, and said orifice to meter the continued flow of fluid through the second valve at a reduced substantially constant rate until said servo has reached a position corresponding to the new governor setting.

19. The combination defined in claim 18 in which the movable elements of said two valves are lands formed by opposite end portions of a piston which slides in a cylinder and cooperating with the remote edges of ports opening into the sides of the cylinder and spaced outwardly from the ends of the piston.

20. The combination defined in claim 19 in which the spacing of the outer edges of said ports from the adjacent ends of said piston in the centered position thereof determines the extent of the rapid increases and decreases in the fuel flow by said fuel regulator following increases and decreases respectively in the speed setting of said governor.

21. The combination defined in claim 18 in which the reduced rates of flow of pressure fluid to or from said servo through said first and second valves are through separate orifices.

22. The combination defined in claim 21 which includes valve means responsive to opposite movements of said piston out of said centered position and operable to render the corresponding one of said two orifices operative selectively.

23. The combination defined in claim 22 in which said orifices are of different sizes whereby to vary the relative rates of reduced fluid flow as controlled by the corresponding ones of said valves.

24. The combination as defined in claim 22 in which said piston is slidable in a cylinder and said orifices are carried by said piston and communicate on one side with the respective ones of said chambers and on the other sides with a recess formed in said piston and opening outwardly from a port at the periphery thereof, said valve means including a slot formed in and extending along the wall of said cylinder and covering the recess opening in said centered position of said piston but exposed at its ends to one or the other of said chambers in response to opposite movements of the pistons away from the centered position.

25. The combination defined in claim 17 in which said metering valve comprises a port extending across said passage and coacting with a land on said piston and movable with the latter across the port after a predetermined movement of the piston out of said centered position.

26. The combination defined in claim 25 in which said port opens into the side of a cylinder and said land is one end portion of a cylindrical piston slidable therein.

27. The combination defined in claim 25 in which said orifice is in a passage movable with said piston.

28. The combination defined in claim 25 in which said port opens into one side of a cylinder and said land is on a stem carried by said piston.

29. The combination defined in claim 28 in which said valve stem is fixed to the closed end of a bellows forming said piston.

30. The combination of a fuel regulator biased in one fuel changing direction and movable back and forth to vary the speed of a prime mover, a hydraulic servo for moving the regulator in the opposite direction, a fluid filled passage communicating at one end with said servo, an all-speed governor including an adjustable speed setter and means operable in response to opposite changes in the load on said prime mover to force fluid into or release fluid from the opposite end of said passage, a cylinder interposed in said passage, a piston slidable back and forth in said cylinder to effect the transfer of fluid into and out of said servo as the pressure regulated by said governor increases and decreases, means in said pitson including an orifice establishing continuous but restricted communication between opposite ends of said cylinder, compression springs in said cylinder acting on opposite ends of said piston to exert oppositely acting biasing forces maintaining the piston in a centered position during steady state control of the servo pressure by said governor and resisting movement of the piston out of such position, and a valve controlling the flow of fluid out of and into one end of said cylinder to and from said servo and having an element movable back and forth with said piston and maintaining the valve open while the piston is in said centered position and during a predetermined movement away from such position in the valve closing direction whereby to permit of a rapid change in the servo pressure by action of the governor and an increase in the compression of one of said springs, said valve element, when reaching a position substantially closing said valve, reducing the further flow of fluid through the valve relative to said servo to a rate determined by the increase in the spring force on the piston and the size of said orifice.

31. The combination as defined in claim 30 including a second valve controlling the flow of fluid out of and into the opposite end of said cylinder and to and from said servo and having an element movable back and forth with said piston to maintain the valve open while the piston is in said centered position and during a predetermined movement away from such position in the valve-closing direction whereby to permit of a rapid change in the servo pressure by action of the governor and movement of the piston to compress the other one of said springs, said second valve, when the piston element thereof reaches a position substantially closing the valve, acting as a hydraulic stop to interrupt the advance of the piston while thereafter coacting with the increased compression of said other spring to meter the further flow of fluid through the second valve relative to said servo at a reduced rate determined by such increased spring force on the piston and the size of said orifice.

32. The combination as defined in claim 31 including a second orifice in said piston cooperating with said first orifice to establish communication between opposite ends of said cylinder through an intermediate recess having an opening at the periphery of the piston, and a slot shorter than the length of said piston formed in the internal wall of said cylinder and extending longitudinally thereof in continuous registry with said opening when said piston is in said centered position but exposed at opposite ends of the cylinder when the piston is moved in opposite directions out of such position.

References Cited
UNITED STATES PATENTS

| | | | |
|---|---|---|---|
| 3,142,154 | 7/1964 | Leeson | 60—39.28 |
| 3,275,008 | 9/1966 | Kerensky | 137—36 X |
| 3,276,461 | 10/1966 | Kerensky | 137—34 X |

CLARENCE R. GORDON, *Primary Examiner.*

U.S. Cl. X.R.

251—50, 54; 137—35; 60—39.28